J. MORTON.

Improvement in Saw-Jointers.

No. 131,964. Patented Oct. 8, 1872.

Witnesses  Inventor

UNITED STATES PATENT OFFICE.

JOHN MORTON, OF BANGOR, MAINE.

IMPROVEMENT IN SAW-JOINTERS.

Specification forming part of Letters Patent No. 131,964, dated October 8, 1872.

*To all whom it may concern:*

Be it known that I, JOHN MORTON, of Bangor, in the county of Penobscot and State of Maine, have invented a certain new and useful Improved Saw-Jointer; and I hereby declare the following to be a full, clear, and exact description of the same, which will enable others to make and use my invention, reference being had to the accompanying drawing forming a part of this specification, in which—

Figure 1:
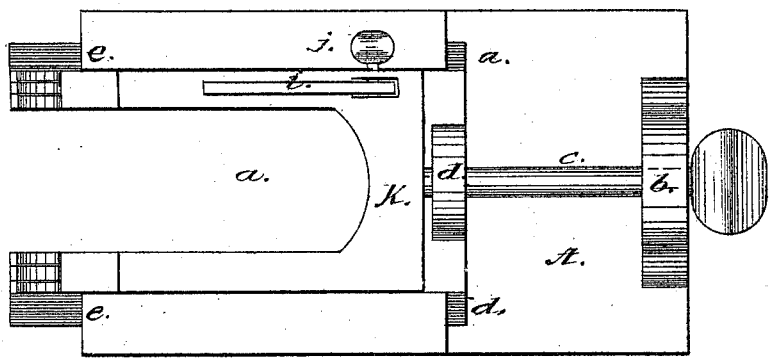
Figure 2:
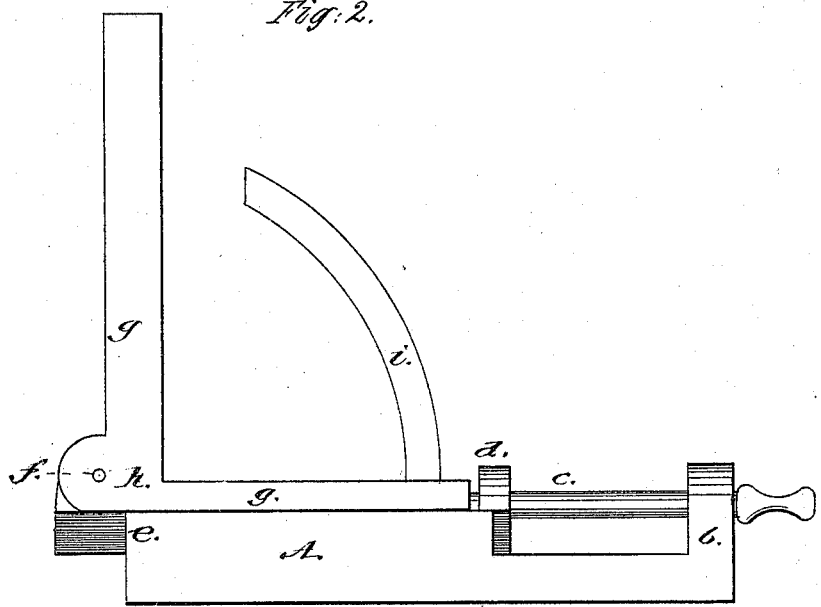

Figure 1 shows a plan view; and Fig. 2 a side elevation.

The object of my invention is to provide a device for jointing saws, which shall be adjustable to circulars of different sizes, so as to enable the surface of the stone to be brought up to the saw, and which at the same time will serve to guide and steady said stone as it is moved backward and forward across the edge of the saw.

Referring to the drawing, A shows a base, which is provided with an opening, $a$, and clamps or screws by which it may be secured to the table in front of the saw. Through a projection, $b$, upon this base passes a screw, $c$, loosely attached to a slide, $d$, moving in grooves $e\ e$ in said base A, so that it may be advanced or withdrawn by means of the screw. This enables it to be pushed up toward the saw to compensate for the wearing away of the stone. To the slide $d$ is attached, by means of a pivot, $f$, a frame, $g$, as shown in Fig. 2, said pivot $f$ passing through the angle $h$ of said frame. An arc, $i$, is also secured to the slide, and provided with a set-screw, $j$, by which the frame may be retained in any position. The stone used in jointing is placed in the angle $h$ of the frame, its sides bearing against it, which serves to steady it as it is moved. The end K is then raised until the surface of the stone is as nearly parallel with the curved edge of the saw as possible, thus increasing its wearing-surface. The teeth are less liable to break than when the edge of the stone is presented, forcing them to cut this edge away before they can bear upon its whole breadth, as is the case when the stone is held upon a horizontal surface. Moreover, by the inclination of the wearing-surface of the stone toward the teeth, a better and sharper cutting-edge is obtained.

What I claim as my invention, and desire to secure by Letters Patent, is—

The combination, in a saw-jointer, of the pivoted frame $g$, arc $i$, and set-screw $j$, or their equivalents, substantially as and for the purposes set forth.

JOHN MORTON.

Witnesses:
 WM. FRANKLIN SEAVEY,
 JOHN WILLIAMS.